United States Patent Office 3,426,138
Patented Feb. 4, 1969

3,426,138
BIS-SULFONYL DIHALOMETHANES AS FUNGICIDES AND BACTERICIDES
Don R. Baker, Pinole, Calif., assignor to Stauffer Chemical Company, New York, N.Y., a corporation of Delaware
No Drawing. Filed Feb. 5, 1964, Ser. No. 342,810
U.S. Cl. 424—337
Int. Cl. A01n 9/14
6 Claims This invention relates to certain substituted bis-sulfonyl dihalomethanes which may be used as fungicides and bactericides. More specifically, the invention relates to the use of compounds of the general formula $$R-SO_2-CX_2-SO_2-R$$

wherein X is selected from the group consisting of chlorine and bromine and R is selected from the group consisting of alkyl, phenyl and halogen substituted phenyl radicals.

The compounds of the present invention can be prepared by reacting formaldehyde with the corresponding alkyl or phenyl mercaptan. The S-substituted bis-sulfide methane can then be oxidized with a wide number of agents, such as hydrogen peroxide and the like, to the bis-sulfonyl methane.

The following list of representative compounds were prepared using the above mentioned general procedure. Compound numbers have been assigned to each compound and are used throughout the balance of the application.

Compound number | Compound
--- | ---
1 | Bis-n-propylsulfonyl dichloromethane.
2 | Bis-ethylsulfonyl dichloromethane.
3 | Bis-ethylsulfonyl dibromomethane.
4 | Bis-n-propylsulfonyl dibromomethane.
5 | Bis-n-butylsulfonyl dibromomethane.
6 | Bis-4-chlorophenylsulfonyl dibromomethane.
7 | Bis-methylsulfonyl dichloromethane.
8 | Bis-methylsulfonyl dibromomethane.

It has been found that these compounds find particular value as fungicides and bactericides. The compounds have been tested and found active as shown in the following typical tests.

IN VITRO VIAL TEST

The compounds were tested against growing fungi and bacteria in an artificial medium. Fungi and bacteria are tested in vitro starting with 4 1-ounce vials partially filled, three (3) with malt broth and one (1) with nutrient broth. The compound to be tested is placed in the vials at any desired concentration (expressed in parts per million) and mixed with the broth. The vials are inoculated with a water suspension of spores of the desired fungi, *Aspergillus niger*, *Penicillium sp.* and *Stemphylium sp.*, and cells of the bacteria *Escherichia coli* (one organism per vial). The bottles are then sealed and held for one week, after which time the results are observed and noted. The concentration which allowed no growth is reported. The following data were obtained in this manner.

TABLE I.—IN VITRO VIAL TEST
[Concentration (p.p.m.) which allowed no growth]

| Compound No. | Aspergillus niger | Penicillium sp. | Stemphylium sp. | Escherichia coli |
|---|---|---|---|---|
| 1 | 25 | 25 | 50 | |
| 2 | 50 | 50 | 50 | |
| 3 | 10 | 25 | 10 | |
| 4 | 10 | 10 | 10 | |
| 5 | 25 | 25 | 25 | |
| 6 | 50 | 50 | | 50 |
| 7 | >50 | >50 | | 1 5 |
| 8 | 25 | 10 | | 25 |

[1] Lowest rate tested.

SOIL INCORPORATION TEST

In the soil fungicide incorporation test, activity of the compound was determined against soil-borne pathogenic fungi. Three fungi were used and tested separately, *Rhizoctonia solani*, *Fusarium solani*, and for especially active compounds, *Pythium ultimum*. Each fungus was added to separate amounts of soil and then 1-pound portions were placed in quart jars. The chemical to be tested was pipetted into the fungus-infested soil at rates beginning at 110 p.p.m. and diluting until the activity had been lost. Cotton was planted into *Rhizoctonia solani*-infested and treated soil. Beans were planted into *Fusarium solani* and into *Pythium ultimum*-infested and treated soils. Three to four weeks later the plants were inspected for disease symptoms. The lowest concentrations which prevented development of disease symptoms are reported. The following results in Table 2 were obtained with the compounds of this invention.

TABLE 2.—SOIL FUNGICIDE TEST
[Concentration (p.p.m.) which allowed no fungus growth

| Compound No. | Rhizoctonia solani | Fusarium solani | Pythium ultimum |
|---|---|---|---|
| 1 | >110 | >27 | |
| 2 | >110 | 110 | |
| 3 | 55 | 13 | 13 |
| 4 | 110 | 110 | |
| 5 | >110 | 110 | |
| 6 | 110 | 110 | |
| | >110 | >110 | |
| | 110 | 27 | |

The compounds of the present invention find particular utility as fungicides and bactericides and may be applied in a variety of ways at various concentrations. They may be combined with suitable carriers and applied as dusts, sprays or drenches. The amount applied will depend on the nature of the utility. The rate of application may also vary with the microbiological use intended.

Various changes and modifications may be made without departing from the spirit and scope of the invention described herein as will be apparent to those skilled in the art to which it pertains. It is accordingly intended that the present invention shall only be limited by the scope of the appended claims.

I claim:
1. The method of inhibiting the growth of bacteria and fungi, comprising applying thereto an effective amount of a compound

$$RSO_2CX_2SO_2R$$

wherein R is a member selected from the group consisting of lower alkyl, phenyl and 4-chlorophenyl and X is a member selected from the group consisting of chlorine and bromine.

2. A method of inhibiting the growth of bacteria and fungi, comprising applying thereto an effective amount of bis-ethylsulfonyl dibromomethane.

3. A method of inhibiting the growth of bacteria and fungi, comprising applying thereto an effective amount of bis-n-propylsulfonyl dichloromethane.

4. A method of inhibiting the growth of bacteria and fungi, comprising applying thereto an effective amount of bis-4-chlorophenylsulfonyl dibromomethane.

5. A method of inhibiting the growth of bacteria and fungi, comprising applying thereto an effective amount of bis-methylsulfonyl dichloromethane.

6. The method of inhibiting the growth of bacteria and fungi, comprising applying thereto an effective amount of a compound
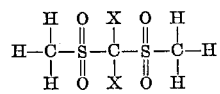
wherein each X is a halogen selected from the group consisting of chlorine and bromine.
References Cited
UNITED STATES PATENTS
2,893,911  7/1959  Raasch _____ 167—22
3,052,597  9/1962  Johnston _____ 167—30
ALBERT T. MEYERS, Primary Examiner.
J. GOLDBERG, Assistant Examiner.